UNITED STATES PATENT OFFICE.

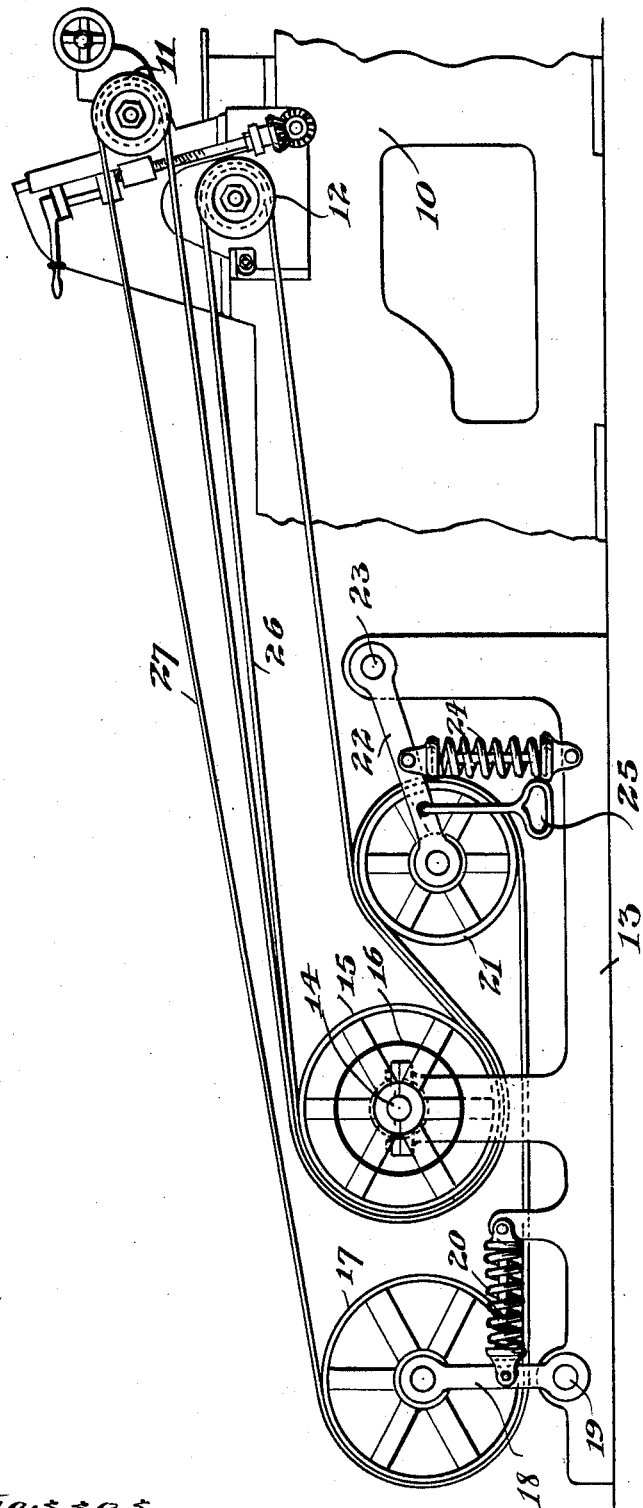

BURT D. STEVENS, OF BELOIT, WISCONSIN, ASSIGNOR TO THE BERLIN MACHINE WORKS, OF BELOIT, WISCONSIN, A CORPORATION OF WISCONSIN.

DRIVING MECHANISM FOR PLANERS.

No. 888,765.  Specification of Letters Patent.  Patented May 26, 1908.

Application filed November 18, 1907. Serial No. 402,658.

*To all whom it may concern:*

Be it known that I, BURT D. STEVENS, a citizen of the United States, residing at Beloit, in the county of Rock and State of Wisconsin, have invented certain new and useful Improvements in Driving Mechanisms for Planers, of which the following is a specification.

My invention concerns driving mechanisms for machines in general, but in the present instance I herein describe an embodiment of the same as applied to wood planers and matchers. In machines of this kind, and especially in those of the fast feed type a considerable amount of power is required to be transmitted to the planer heads by means of belts. As is obvious, under such circumstances endless belts are preferable and require means for maintaining them taut as they become more or less stretched.

My present invention provides means for keeping each of the belts taut and automatically taking up its slack, and I use but a single driving pulley for each pair of belts, and at the same time arrange the parts in such relation that each of the belts passes around a considerable portion of the periphery of the driving pulley, whereby to permit of the transmission of considerable power without slipping of the belts.

My improved construction and arrangement of parts also permit the ready removal of the belt of the lower planer head without disturbing that of the upper head.

On the accompanying drawing, forming a part of this specification, I have illustrated a single embodiment of my invention as applied to a wood planer or matcher.

The planer 10 has the usual upper and lower rotatable planer head and pulleys 11 and 12 which constitute the driven pulleys of the mechanism illustrated. On a suitable bed 13 and rotatable in bearings is a driving shaft 14 having fixed thereto a driving pulley 15, the shaft 14 being rotated by means of the smaller pulley 16. On the side of the driving pulley 15 remote from the driven pulleys 11 and 12 I provide a belt tightening pulley or wheel 17 rotatably mounted in a hinged frame or support 18 pivoted to the base at 19 and spring-pressed away from the driving pulley 15 by the spring-actuated device 20, which may be of any of the usual or ordinary forms. Between the driving pulley 15 and the driven pulleys of the planer heads I provide another belt tightening rotatable wheel or pulley 21 mounted in a frame or support 22 hinged or pivoted at 23, whereby the wheel 21 may have an up and down movement by the swinging of the support 22 about its hinge pin 23. Another spring mechanism 24 is interposed between the support 22 and the base of the machine tending to force the wheel 21 upwardly, as is obvious from a consideration of the drawing. In order to temporarily lower the wheel 21 I attach to the support 22 a stirrup 25 in which the operator may place his foot and cause the wheel 21 to descend in opposition to the action of the upwardly-pressing spring 24. A belt 26 passes around the driven pulley 12 and the driving pulley 15, while another belt 27 passes around the driven pulley 11, the belt tightening wheel 17, the similar wheel 21, and the driving pulley 15, not in direct contact therewith but rather over the shorter belt 26.

Obviously, each of the belts is wrapped around the driving pulley 15 to a considerable degree, thereby permitting a large amount of power to be transmitted from the driving pulley through the belts to the planer heads. The tightening wheel 17, owing to the spring-pressure tending to force the same away from the driving pulley 15, acts to maintain the belt 27 taut and to take up or compensate for any stretching of the same. As is clearly illustrated, the wheel 21 is pressed upwardly by the spring 24 so as to force that portion of the belt 27 on its periphery or cylindrical surface against the under face of the lower stretch of the belt 26 to maintain the belt taut for the purpose specified. It should be noticed, however, that the vertical movement of the wheel 21 has but very slight effect on the belt 27, although it does effectively act to tighten the belt 26, and even the slight influence which the movement or adjustment of the wheel 21 has on the belt 27 is readily compensated for by the wheel 17 which is free to move toward or from the driving pulley.

It will be observed that in my improved device I am enabled to use a single driving pulley for rotating both planer heads, and at the same time provide means for individually maintaining taut the two driving belts. As is apparent, one of these belts may stretch more than the other, and such elongation is readily taken up by the corresponding tightener without substantial influence on the other belt. In some cases it is desirable to throw the lower cutter head out of action, and this is readily accomplished by the operator stepping in the stirrup 25, thereby taking the tension off the belt 26, whereupon it can be readily guided off of its two pulleys without disturbing the belt 27.

This mechanism may be used on one side of the machine, as shown in the drawing, or it may be duplicated on the other side of the machine as is customary in planers or matchers with fast feed in order to secure a sufficient transmission of power to the planer heads.

It should be noticed that it is due to the fact that the two belt tightening wheels act in directions at substantially right angles to each other that I am enabled to tighten the belt 26 without substantially modifying the tension on the belt 27 which passes around the tightening wheel operating the belt 26.

To those skilled in the art it will be apparent that various modifications may be made in the structure herein shown and described in detail without departure from the spirit of my invention or the sacrifice of any of its benefits or advantages.

I claim:

1. In a machine of the character described, the combination of a pair of driven pulleys, a driving pulley, a pair of automatically-acting belt tightening wheels, a first belt passed around one of said driven pulleys, said driving pulley, and both of said belt-tightening wheels, and a second belt passed around the other driven pulley and the driving pulley, one of said belt-tightening wheels acting on one of said belts while the other belt-tightening wheel acts on the other belt, substantially as described.

2. In a machine of the character described, the combination of a pair of driven pulleys, a driving pulley, a pair of automatically-acting belt-tightening wheels, a first belt passed around one of said driven pulleys, said driving pulley, and both of said belt-tightening wheels, and a second belt passed around the other driven pulley and the driving pulley beneath said first belt, one of said belt-tightening wheels acting on one of said belts while the other belt-tightening wheel acts on the other belt, substantially as described.

3. In a machine of the character described, the combination of a pair of driven pulleys, a driving pulley, a first automatically-acting belt-tightening wheel on the side of said driving pulley opposite said driven pulleys, a second automatically-acting belt-tightening wheel on the same side of said driving pulley as said driven pulleys, a first belt passed around one of said driven pulleys, said driving pulley, and both of said tightening wheels, and a second belt passed around the other driven pulley and said driving pulley, said first tightening wheel acting on said first belt and the second tightening wheel acting on said second belt, substantially as described.

4. In a machine of the character described, the combination of a pair of driven pulleys, a driving pulley, a first belt-tightening wheel on the side of said driving pulley opposite said driven pulleys, a second belt-tightening wheel on the same side of said driving pulley as said driven pulleys, a first belt passed around one of said driven pulleys, said driving pulley, and both of said tightening wheels, a second belt passed around the other driven pulley and said driving pulley, means pressing said first tightening wheel away from said driven pulleys to maintain the first belt taut, and means pressing said second tightening wheel toward said second belt to tighten the same, substantially as described.

5. In a machine of the character described, the combination of a pair of driven pulleys, a driving pulley, a first belt-tightening wheel on the side of said driving pulley opposite said driven pulleys, a second belt-tightening wheel on the same side of said driving pulley as said driven pulleys, a first belt passed around one of said driven pulleys, said driving pulley, and both of said tightening wheels, a second belt passed around the other driven pulley and said driving pulley beneath said first belt, means pressing said first tightening wheel away from said driven pulley to maintain said first belt taut, and means pressing said second wheel and the first belt passing therearound against said second belt to tighten the same, substantially as described.

BURT D. STEVENS.

Witnesses:
C. F. PERKINS,
W. E. BERTSCH.